Figure 1:
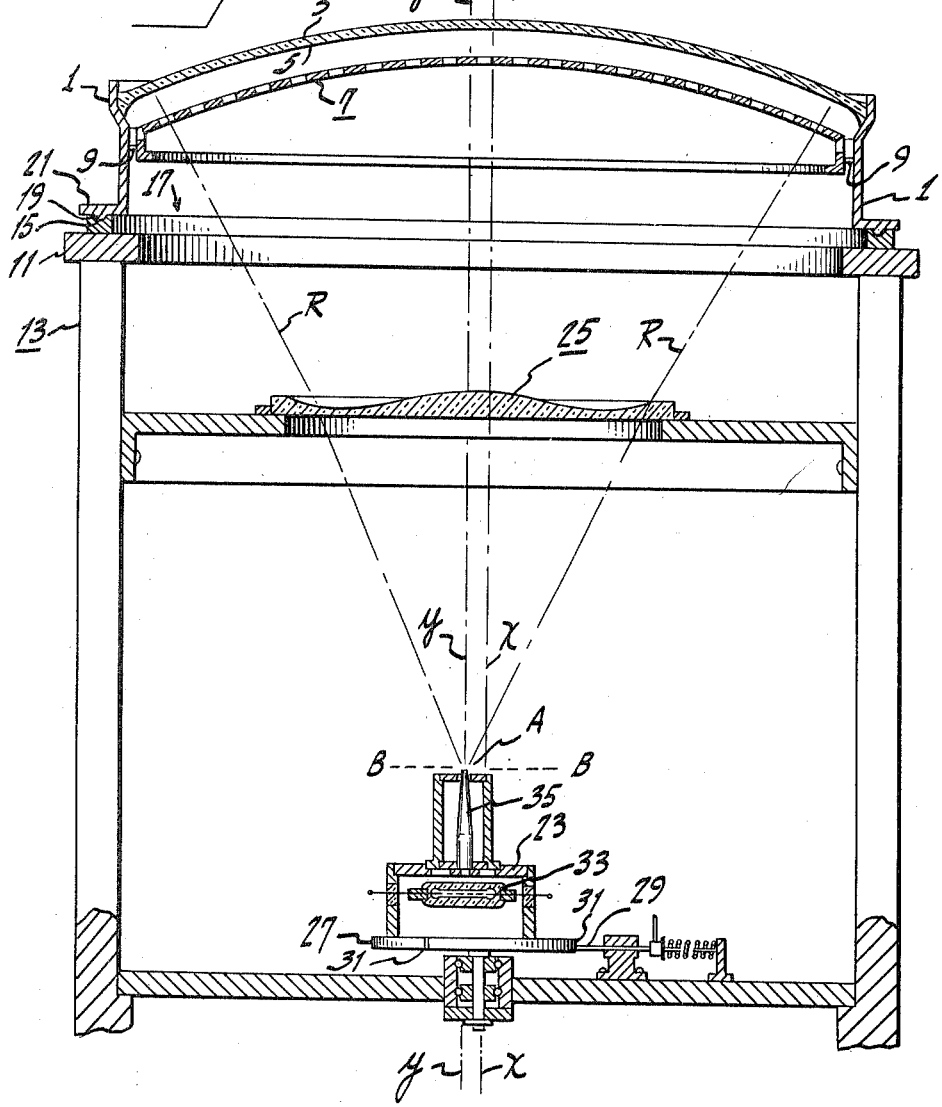

INVENTORS
DAVID W. EPSTEIN
PETER E. KAUS &
DAVID D. VAN ORMER
BY Roderick Malcolm
ATTORNEY Dec. 24, 1957  D. W. EPSTEIN ET AL  2,817,276
MANUFACTURE OF COLOR-KINESCOPES, ETC
Filed Feb. 1, 1955  3 Sheets-Sheet 3

INVENTORS
DAVID W. EPSTEIN
PETER E. KAUS &
DAVID D. VAN ORMER
BY Roderick Malcolm
ATTORNEY

United States Patent Office 2,817,276
Patented Dec. 24, 1957

2,817,276

MANUFACTURE OF COLOR-KINESCOPES, ETC.

David W. Epstein and Peter E. Kaus, Princeton, N. J., and David D. Van Ormer, Lancaster, Pa., assignors to Radio Corporation of America, a corporation of Delaware Application February 1, 1955, Serial No. 485,542

7 Claims. (Cl. 95—1)

This invention relates to improvements in the art of manufacturing color-kinescopes and other cathode-ray (C. R.) tubes of the kind containing a screen-unit comprising a grill or "mask" having a multiplicity of systematically arranged apertures through which beam-electrons pass along different angularly related paths in their transit from the tube's plane-of-deflection to respectively different ones of the dot-like (or line-like) areas which make up the mosaic target-surface of a nearby screen-electrode.

The "plane-of-deflection," mentioned in the preceding paragraph is the plane in which the axis of each beam, when extended rearwardly from the screen-unit, intersects the axis of origin of that beam. When the beams are undeflected, i. e. when they are directed very near to the center of the screen, the "normal" plane-of-deflection crosses the central axis of the tube usually near the center of its deflection yoke. In the case of a tri-color kinescope the points at which said axes intersect are hereinafter sometimes referred to as "deflection centers" or as the "virtual source" of a particular ("red," "blue" or "green") electron beam. The term "deflection angle" is used herein to designate the angle subtended by the central axis of the tube and a line drawn from any point on the screen, or its mask, to the point where said central axis intersects the normal plane-of-deflection.

In the manufacture of tri-color kinescopes of the "masked-target dot-screen" variety the relationship or "register" of the color-phosphor dots and the mask-apertures is determined, usually, by light-rays emanating from a small source located, successively, at points corresponding to the normal deflection centers of the complete tube. When the completed tube is operated, electron-beams take the place of the light-rays that were used in plotting the location of the color-phosphor dots. To obtain color purity, at least for small deflection angles, the beam-deflecting magnetic yoke is so located (on the neck of the tube) that the normal plane-of-deflection coincides with the plane from which the light rays were projected in the light box or "lighthouse" used in the screen-plotting operation. However, in a C. R. tube the plane-of-deflection, and hence the deflection-centers, are not stationary but move closer to the shadow-mask as the deflection angle increases. This unavoidable movement of the plane-of-deflection causes radial misregister between the electron-beams and the phosphor dots. Such misregister, unless compensated for, results in color-dilution and other disturbing image-defects.

One way of avoiding misregister is to employ a mask having "graded" apertures i. e. apertures of different sizes decreasing in diameter outwardly from the center of the array. Here, as the electron beam or beams approach the boundaries of the screen, the effective diameter of each beam gradually decreases and, as a consequence, can strike the dot-like color areas off-center without infringing upon the next adjacent color-area or areas. However, a "graded" mask decreases the quantity of electrons (and hence the light output) available adjacent to the edges of the screen.

Another way of avoiding misregister is to employ an electronic plotting method in the manufacture of the mosaic screen. This method however is relatively expensive because it requires that the mask and the photographic plate, from which the mosaic is made, be mounted in an evacuable chamber equipped with scanning coils, voltage supplies, etc.

Accordingly, the principal object of the present invention is to provide an improved method of and means for minimizing radial misregister and consequent image-defects in C. R. tubes of the subject variety.

Another and important object of the invention is to achieve the above-mentioned principal object without noticeably decreasing the light output of any part of the mosaic screen of the tube to which the invention is applied, or without resorting to the use of an evacuable chamber etc. during the screen-plotting operation.

The foregoing and related objects are achieved in accordance with the invention by the use of correcting lens interposed between the light source and the mask during the screen-plotting operation. The correcting lens is designed to move the apparent or virtual source of light as a function of deflection angle in the same way that each deflection-center in the finished tube moves as a function of reflection angle. Hence each phosphor dot is located at the particular spot where the beam-electrons impinge.

Figure 2:
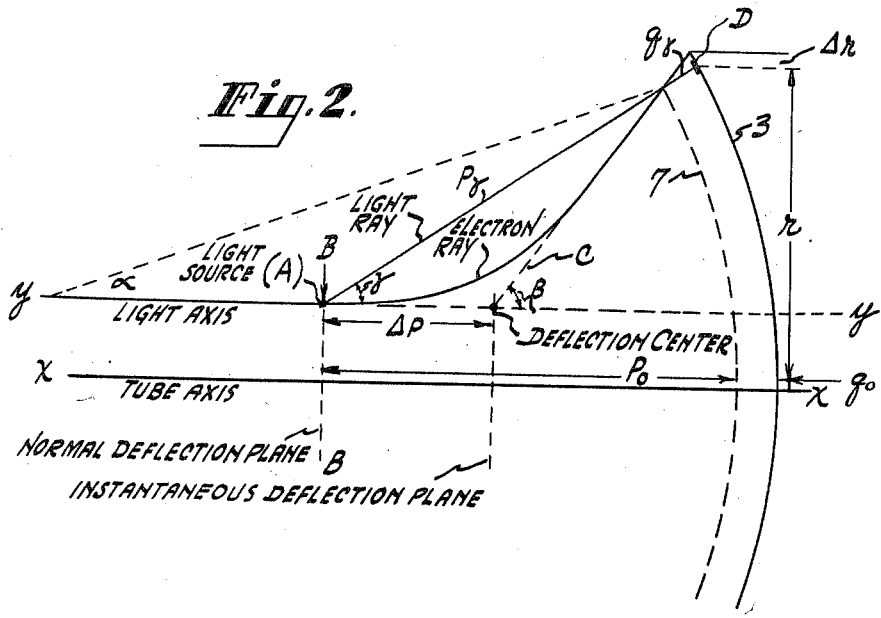
Figure 3:
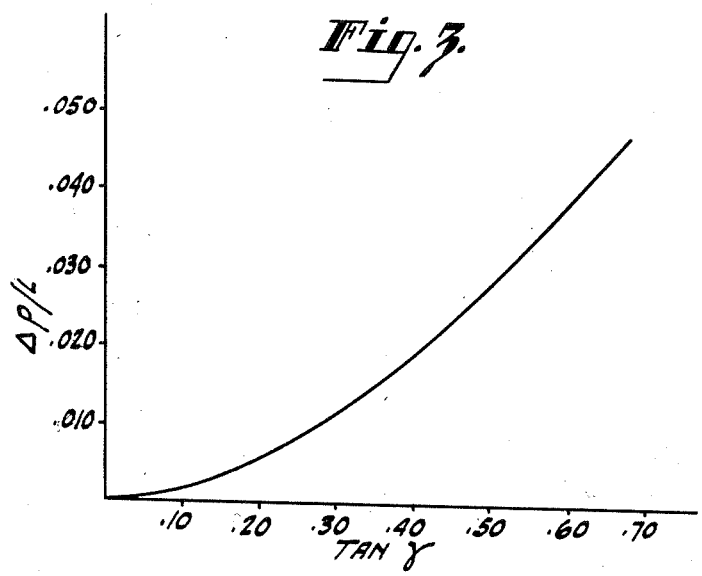
Figure 4:
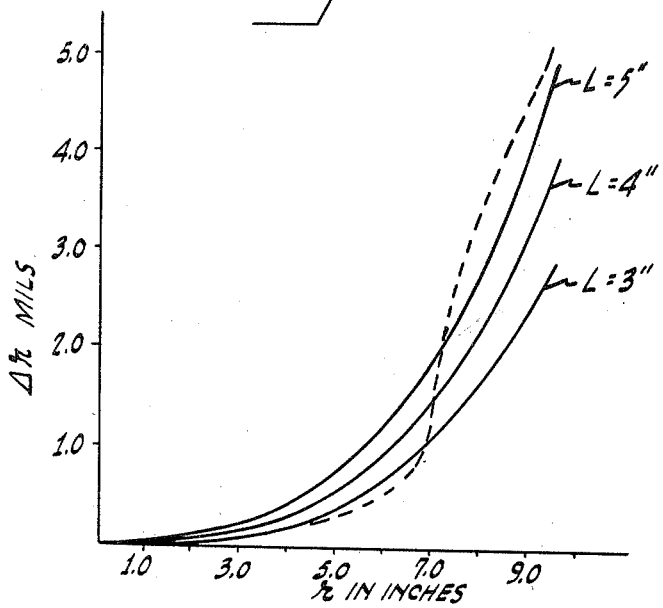
Figure 5:
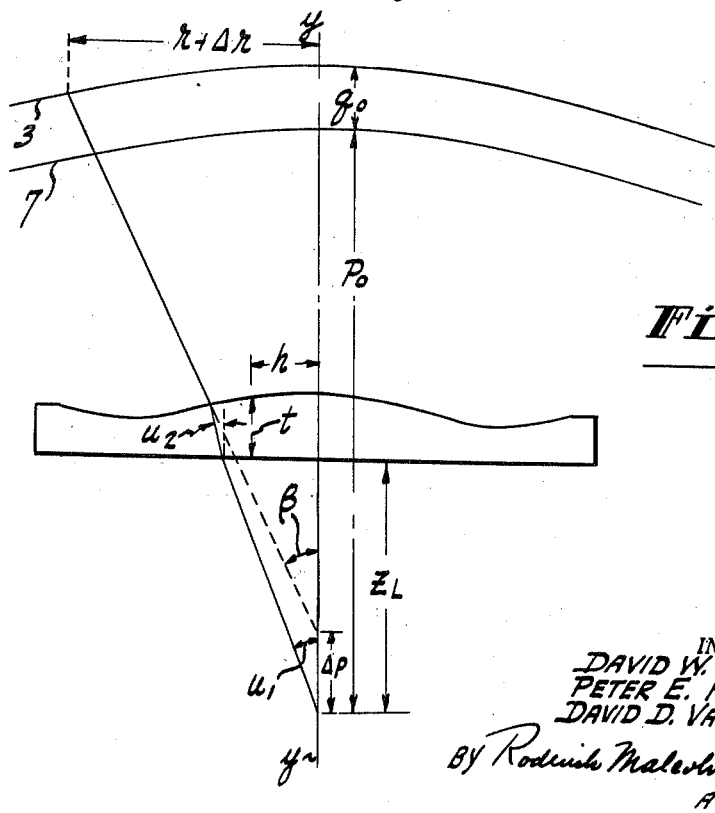

The invention is described in greater detail in connection with the accompanying three sheets of drawings, wherein:

Fig. 1 is an elevational view, partly in section, of a photographic lighthouse having an optical system, including a correcting lens constructed in accordance with the principle of the present invention and showing the mask and screen-plate of a color-kinescope set up thereon in a position to record, upon the screen-plate, the pattern with which light rays from the lens are endowed in passing through the systematic pattern of apertures in the mask;

Fig. 2 is a schematic diagram showing the path of electrons in a C. R. tube as compared to the path of light rays in a lighthouse of the prior art (i. e. one without a correcting lens). This drawing, which will be referred to in explaining the principle of the present invention, is not drawn to scale;

Fig. 3 is a curve the ordinate of which is the amount ($\Delta P/L$), in terms of units of the length (L) of the deflection field, that the plane-of-deflection moves away from its normal plane during operation of a C. R. tube; the abscissa being the tangent of the deflection angle ($\gamma$);

Fig. 4 is a family of three solid-line curves showing the expected radial misregister ($\Delta r$), in terms of mils, for uniform magnetic deflection fields of various lengths (L), given as a function of radius on the screen, in terms of inches, and a broken-line curve showing actual misregister as observed in a color-tube using a conventional magnetic yoke; and Fig. 5 is a schematic diagram showing the screen-unit and the lens of Fig. 1; the drawing being marked to show the path of a light ray in its transit from a color-center through the lens and mask to the screen.

In Figure 1, 1 designates the cylindrical metal or glass side wall of the "front end" of a color-kinescope (not shown) of the 3-gun shadow-mask variety at that stage of its manufacture whereat the inner or "target" surface of its face-plate or screen 3 has been provided with a coating 5 comprising a photographic emulsion for recording the mosaic pattern impressed thereon by reason of the presence of the tube's shadow-mask 7 in the path of light rays emanating from small area or a "point" A (later described) corresponding to the small area or point traversed by one of the three electron-beams in the tube's normal plane-of-deflection. Assuming that the point A in the plane of deflection B—B is the one traversed by the "red" beam in such a kinescope, then the emulsion coating 5 on the target surface of the screen 3 may contain a red-phosphor such, for example as manganese activated zinc phosphate.

The apertured shadow-mask 7 (which, like the screen-plate 3, is here shown in the form of a circular section of spherical shell), is removably supported on the inner surface of the side-wall 1 as on three or more pins 9 to permit the mask to be removed from the assembly during the three emulsion-coating and developing operations incident to laying down the three (red, blue and green) color-phosphors. It is of course necessary that the screen-unit (i. e. the screen-plate 3 and its apertured mask 7) be aligned very accurately with respect to the point A and, to this end, the metal cylinder 1 within which said unit is supported, and the top 11 of the table or pedestal 13 upon which said cylinder is mounted, are provided with a suitable indexing mechanism. The indexing mechanism here shown comprises three radially extending V-grooves 15 disposed in circumferentially spaced relationship about the central opening 17 in the table-top 11 and a similar number of protuberances 19 formed in the sealing flange 21 about the lower edge of the cylinder 1 within which the screen-unit is mounted. The protuberances 19 have rounded terminals which engage the slanting sides of the V-grooves 15 and hence provide a self-leveling, self-centering support which holds the screen-unit accurately centered on the vertical axis $x$—$x$ of the pedestal.

The optical system of the lighthouse of Figure 1 comprises a source of light (later described) contained within a box 23 adjacent to the base of the lighthouse and a correcting lens 25 interposed between the light-source and the shadow-mask. As will hereinafter more fully appear the lens 25 and the other elements of the optical system are designed, positioned and arranged to cause the light rays to impinge upon the same elemental areas of the screen plate 3 as will the beam-electrons during operation of the complete tube.

As above mentioned the source of light for the optical system of the lighthouse is contained within a box 23. This box is mounted on a turntable or turret 27 for rotation about the central axis $x$—$x$ of the lighthouse. The turntable 27 serves to bring the point A of the system to the position of any one of the three-beams in the normal plane-of-deflection of the 3-gun color-kinescope in which the screen-unit 3, 7 is to be used. A suitable indexing mechanism, which may comprise a spring loaded plunger 29 which seats in appropriately spaced dwells 31 in the rim of the turntable 27, ensures the accurate location of the point A of the optical system.

The primary source of light within the box 25 preferably comprises an ultra-violet lamp 33, such as a General Electric Co. one kilowatt high pressure mercury arc lamp, type BH6. Ultra-violet rays of wave-length of from say, 3200 to 4500 Angstroms, are preferred because their use permits the described screen-plotting operation to be carried out practically in day-light. This small mercury-vapor lamp or tube 33 has a light-emitting central portion about one inch long which is disposed with its center on the "light axis" $y$—$y$ of the system. This light axis $y$—$y$ corresponds to the axis of origin of one of the electron-beams and is parallel to the central axis $x$—$x$ of the lighthouse when the turntable 27 is in any one of its three previously described positions.

Light rays from the lamp 33 are conducted along the light axis $y$—$y$ to the point A which in the instant case, lies in or closely adjacent to the normal plane-of-deflection B—B through a tapered light conduit 35 constituted essentially of a material having a high index of refraction and of high transparency to rays of the particular wave-lengths employed. Having regard also to the heat generated as an incident to the operation of the lamp 33, the conduit 35 is preferably constituted of quartz or of heat resisting glass, such as Pyrex. Optically clear fused quartz is to be preferred to Pyrex since when the latter material is used a somewhat longer exposure time is required to produce a mosaic screen-pattern of the desired high quality.

The function and design of the optical lens 25 in the "lighthouse" of Fig. 1 will the more readily be understood upon reference to Figs. 2–5, and to the formulae in the following description.

In Fig. 2, as in Fig. 1, B—B designates a reference plane corresponding to the tube's "normal" plane-of-deflection, and the point A is a color-center (e. g. the "red" color-center) from which light rays are projected towards the apertured-mask 7 and screen-plate 3. It will be observed that the plane B—B from which the light rays are projected intersects the central axis $x$—$x$ of the tube at a distance $P_0$ from the mask 7. In the absence of the lens 25 of Fig. 1 a light ray making a deflection angle $\gamma$ with the light axis $y$—$y$ will cause a phosphor dot D to be placed on the screen plate 3 at a radius $r$. However, as previously pointed out, an electron ray passing through the point A and subjected to deflection forces from a conventional yoke would not traverse the same path as the light ray and hence would fail to strike the center of the dot D. This is so because there are basic differences between the electron path and the optical path. The principal difference is manifest from the fact that the asymtotic direction of the electron path when extrapolated back (as indicated by the broken straight line $c$) intersects the light axis $y$—$y$ at a distance $P_0 - \Delta P$ from the shadow mask, where $\Delta P$ is a function of the deflection angle $\gamma$. A calculation based upon an assumed constant or uniform deflection field of length L, leads to the following expression $$\Delta P = (L/2) \tan^2 (\gamma/2) \qquad (1)$$

Fig. 3 shows $(\Delta P/L)$ as a function of $\tan \gamma$. Referring now to both Figs. 2 and 3: Due to the difference $\Delta P$ between light source (i. e. point A) and deflection center the electron beam will not strike the screen at radius $r$, where the phosphor dot D is located, but at $r+\Delta r$. The expression for $\Delta r$ is given by:

$$\Delta r = \Delta P[q\gamma/P\gamma][\tan \gamma/(1+\tan \gamma \tan \alpha)] \qquad (2)$$

where $\Delta P$ is given by Formula 1, $P_\gamma$ is the distance from the light source to the common point of incidence of the light ray and electron ray on the mask, $q_\gamma$ is the mask-to-screen spacing measured along the light ray; $\alpha$ is the angle formed by the light axis $y$—$y$ and a line extending from the center of curvature of the mask to said common point of incidence.

Fig. 4 gives the expected $\Delta r$, plotted as a function of the radius $r$, for a conventional (21") shadow-mask tube, assuming yokes of effective length $L=3, 4, 5$ inches. The dashed curve in this drawing represents actual measurements of such misregister on a conventional tube.

The purpose of the lens 25 in the lighthouse of Fig. 1 is to refract the optical ray for a given deflection angle $\gamma$, so that the final ray when extended rearwardly hits the light axis $y$—$y$ at $P_0 - \Delta P$, just as the electron path does. The lens makes the electron optics of the tube and the light optics of the lighthouse coincide so that, as shown in Fig. 5, the light rays strike the screen at $r+\Delta r$, just as the electron ray does in Fig. 2, so that misregister is reduced practically to zero. The symbols marked on Fig. 5 are:

$t$=thickness of the lens
$h$=radius of the lens
$\beta$=the inclination, to the light axis ($y$—$y$), of a particular ray in the neighborhood of the mask 7 and screen 3
$u_1$=the inclination of the corresponding light ray before incidence on the lens 25
$u_2$=the inclination of the same ray inside the lens assuming that (as shown in the drawing) the first face of the lens is flat
$Z_L$=the distance from the light source to the first face of the lens.

The design of the lens is given with reference to the above defined symbols in Fig. 5. The expression for the slope $dt/dh$ is:

$$dt/dh = \left[\frac{\sin \beta - \sin u_1}{N \cos u_2 - \cos \beta}\right] \quad (3)$$

where $\sin u_1 = N \sin u_2$ $h = (\tan u_1)z_L + (\tan u_2)t$ $h = \tan \beta(z_L + t - \Delta P)$ $\tan \beta = \dfrac{P_\gamma \sin \gamma}{(P_\gamma \cos \gamma - \Delta P)}$ $N$ = index of refraction at the wavelength of the light used in the lighthouse The distance from the light source (point A) to the first face of the lens 25 (i. e. the distance $Z_L$ in the above formula) is described in connection with Fig. 1 as being measured from a reference plane (B—B) which coincides with the "normal" plane-of-deflection. This is a convenient but by no means necessary limitation since the important thing is the path (i. e. the inclination $\beta$) of the light rays after leaving the lens. Accordingly, it will be apparent, from the Formula 3 (supra), that the reference plane (B—B, Fig. 1) that contains the point A from which the light rays are projected may be located in a position corresponding to the position of the plane-of-deflection at any particular deflection angle, including a "zero" deflection angle. Indeed it is entirely possible, e. g. by the use of a catadioptic optical system adjusted for finite conjugate foci, to arrange the source of light at practically any position remote from the mask.

The $\Delta P$ used in the actual design of the lens 25 need not be exactly as given by Formula 1, but Formula 2 may be used to solve for $\Delta P$ after direct measurements of $\Delta r$ have been made on the particular tube-type in which the screen is to be used. The slopes ($dt/dh$) are then determined at several $h$ values. A polynomial is passed through the $dt/dh$ values, giving $dt/dh$ at any $h$. The polynomial is then integrated, yielding the thickness $t$ as a function of $h$, and therefore giving the actual lens grinding instructions.

Reference has been made in the preceding paragraph to the fact that it may be desirable to solve for $\Delta P$ (i. e. the forward movement of the deflection plane) after direct measurements of $\Delta r$ (the actual radial misregister of the electron-beam with respect to the center of its phosphor dot, or dots) have been made at several radii on the particular tube-type in which the screen is to be used. One such set of measurements is shown, by way of example, by the broken-line curve of Fig. 4. The particular tube in which the misregister was measured employed a deflection yoke in which the deflection field was about five inches long (corresponding approximately to the theoretical solid line curve wherein $L=5''$). The differences in the slope of the theoretical (solid line) curve ($L5''$) and the empirical (broken-line) curve can be accounted for, principally, by the facts: (a) that yoke-fields are never homogeneous and (b) the face-plate of a C. R. tube becomes slightly deformed when evacuated. These common defects (a) and (b), result in the same ("radial") type of misregister as that caused by movement of the plane-of-deflection in a homogeneous field. It is thus apparent that the use of direct measurements of $\Delta r$, in the formulas of the invention provides a lens system that corrects for any misregister of the "radial" variety, irrespective of cause.

In conclusion, attention is called to the fact that the optical system of the invention has been described, in the interests of simplicity, as embodied in a single lens having a plane first-surface and a curved second-surface. It will nevertheless be apparent to those skilled in the lens-making art that the invention is susceptible of more complex embodiments such, for example, as one employing a lens having two curved surfaces or to one incorporating two or more lens elements.

From the foregoing it should now be apparent that the present invention provides a novel method of and means for minimizing radial misregister and consequent image defects in color-kinescopes and other cathode-ray (C. R.) tubes of the masked-target variety.

What is claimed is:

1. Apparatus for plotting upon a photographic plate a pattern corresponding to the mosaic pattern on the screen of a cathode-ray tube of the kind having (i) a plane-of-deflection the actual location of which varies as a function of the instantaneous deflection angle of the beam-electrons within said tube and (ii) a screen-unit comprising a mask containing a multiplicity of systematically arranged apertures through which said beam-electrons pass in their transit from spaced points in said variably located plane-of-deflection to respectively different elements of the mosaic pattern on said screen; said apparatus comprising: a support for holding said mask and plate in the same relative position that the mask and screen are to occupy in said cathode-ray tube, a source of light, means for deriving light rays from said source and for projecting the same toward said mask and plate, and an axially symmetric aspheric optical system mounted in the path of light rays from said source, said system having optical properties such that light rays incident thereon at a given angle appear, after leaving the system, to have originated at a point corresponding to the position in said plane-of-deflection of said beam-electrons when the latter are subjected to a deflection angle corresponding to said given angle.

2. Apparatus for plotting upon a photographic plate a pattern corresponding to the mosaic pattern on the screen of a cathode-ray tube of the kind having (i) a plane-of-deflection the actual location of which varies as a function of the instantaneous deflection angle of the beam-electrons within said tube and (ii) a screen-unit comprising a mask containing a multiplicity of systematically arranged apertures through which said beam-electrons pass in their transit from spaced points in said variably located plane-of-deflection to respectively different elements of the mosaic pattern on said screen; said apparatus comprising: a support for holding said mask and plate in the same relative position that the mask and screen are to occupy in said cathode-ray tube, a source of light, means for deriving light rays from said source and for projecting the same toward said mask and plate, and an axially symmetric aspheric lens mounted in the path of said light rays, the variation in the thickness ($t$) with the radius ($h$) of said lens being that given, substantially, by the formula:

$$\frac{dt}{dh} = \frac{\sin \beta - \sin u_1}{N \cos u_2 - \cos \beta} \quad (1)$$

where $\beta$ is the inclination, to the light axis ($y$—$y$), of a particular ray in the neighborhood of said mask and plate, $u_1$ is the inclination of the corresponding light ray before incidence on said lens, $u_2$ is the inclination of the same ray within the lens, assuming that the first face of the lens is flat and N is the index of refraction of said lens at the wavelength used.

3. Apparatus for plotting upon a photographic plate a pattern corersponding to the mosaic pattern of the screen of a cathode-day tube of the kind having (i) a plane-of-deflection the actual location of which varies as a function of the instantaneous deflection angle of the beam-electrons within said tube and (ii) a screen-unit comprising a mask containing a multiplicity of systematically arranged apertures through which said beam-electrons pass in their transit from spaced points in said variably located plane-of-deflection to respectively different elements of the mosaic pattern on said screen; said apparatus comprising: a support for holding said mask and plate in the same relative position that the mask and screen are to occupy in said cathode-ray tube, a source of light, means for deriving light rays from said source and for projecting the same toward said mask and plate from a point corresponding to the position of one of one of said spaced points in said variable plane-of-deflection when the latter is located in a position dictated by a particular deflection angle of said beam-electrons, and an optical lens mounted in the path of said light rays in the space between said point and said mask, said lens having a profile such that light rays incident thereon at a given angle appear, after leaving the lens, to have originated at a point corresponding to the position in said plane-of-deflection of said beam-electrons when the latter are subjected to a deflection angle corresponding to said given angle.

4. Apparatus of the character described comprising, a support for holding the apertured mask and screen of the screen-unit of a cathode-ray tube of the masked target variety in the same relative position with respect to a reference plane that said mask and screen are to occupy in said tube with respect to the tube's plane-of-deflection when the latter is located in a position dictated by a particular deflection angle of the beam-electrons within said tube, whereby said screen may be illuminated by a pattern of light with which light rays emanating from any of several points in said reference plane are endowed by the presence of said apertured mask in their path, a source of light, means for deriving light rays from said source and for projecting the same toward said mask and screen from a selected one of said points, and an optical lens mounted in the path of said light rays in the space between said reference plane and said mask for causing said light rays to approach said mask and plate along paths corresponding substantially to those traversed by said beam-electrons in passing from said selected point to said mask and screen along all of the various deflection angles of said cathode-ray tube.

5. The invention as set forth in claim 4 and wherein the point from which said light rays are projected lies adjacent to a reference plane located in a position corresponding to that of said plane-of-deflection when the latter is in the position dictated by a substantially zero deflection angle.

6. In the art of manufacturing a cathode ray tube of the kind having a plane-of-deflection the actual location of which varies as a function of the instantaneous deflection angle of the beam-electrons within said tube and containing a screen-unit comprising a foraminous electrode having a multiplicity of systematically arranged apertures through which said beam-electrons pass in their transit from spaced points in said variably-located plane-of-deflection to respectively different sub-elemental areas on the mosaic target surface of a nearby screen electrode; the method of plotting the desired relative location on said target surface of the sub-elemental areas of which said mosaic is to be comprised, said method comprising: Mounting a mask containing the same pattern of apertures as said foraminous electrode and a photographic plate in the same relative position that said foraminous electrode and said mosaic-surface are to occupy in said cathode-ray tube, projecting light-rays towards said mask from one of said spaced points in a plane located in a position corresponding to the position of said plane-of-deflection at a particular deflection angle of said beam-electrons, optically altering the paths of said light rays in their transit to said mask to cause said rays to approach said mask along paths corresponding substantially to the paths traversed by electrons in passing from said one of said points to said foraminous electrode along all of the various deflection angles of said cathode-ray tube, and photographically recording upon said photographic plate, as the desired plot, the pattern of impact of said optically altered light rays upon said plate subsequent to their passage through the systematically arranged apertures in said mask.

7. The invention as set forth in claim 2 and wherein the following relations obtain between the quantities involved in the formula:

$$\frac{dt}{dh} = \frac{\sin \beta - \sin u_1}{N \cos u_2 - \cos \beta}$$

and (a) the distance between the point from which the light is projected and the lens $Z_L$, (b) the distance $P\gamma$ between said point and the point of incidence on the mask, (c) the angle $\gamma$ between the vector $P\gamma$ and the light axis, (d) the displacement $\Delta P$ of the center of deflection of the (central) electrons along the light axis from the center of deflection for very small deflection angles, (e) the radial displacement $\Delta r$ of the point of incidence on the screen of said electron rays passing through the center of a particular mask aperture from the point of incidence of a light ray passing through the center of the same mask aperture and diverging from a fixed light source placed at the center of deflection on the axis for small deflection angles, (f) the distance $q$ between mask and plate measured in the direction of the vector $P\gamma$ and the angle $\alpha$ formed by a radius vector from the center of curvature of the mask to the point of incidence on the mask with the tube axis:

$$\sin u_1 = N \sin u_2$$

$$h = (\tan u_1)Z_L + (\tan u_2)t = (\tan \beta)(Z_L + t - \Delta P)$$

$$\tan \beta = \frac{P_\gamma \sin \gamma}{P_\gamma \cos \gamma - \Delta P}$$

$$\Delta P = \frac{\Delta r P_\gamma (1 + \tan \gamma \tan \alpha)}{q_\gamma \tan \gamma}$$

References Cited in the file of this patent

UNITED STATES PATENTS

| | | |
|---|---|---|
| 2,664,027 | Raitiere | Dec. 29, 1953 |
| 2,703,456 | Smyth | Mar. 8, 1955 |

UNITED STATES PATENT OFFICE

CERTIFICATE OF CORRECTION

Patent No. 2,817,276                                    December 24, 1957

David W. Epstein et al.

It is hereby certified that error appears in the printed specification of the above numbered patent requiring correction and that the said Letters Patent should read as corrected below.

Column 2, line 25, for "reflection" read --deflection--; column 6, line 67, for "corersponding" read --corresponding--; column 7, line 7, strike out "of one", first occurrence.

Signed and sealed this 11th day of February 1958.

(SEAL)
Attest:

KARL H. AXLINE                                          ROBERT C. WATSON
Attesting Officer                                       Commissioner of Patents